(12) United States Patent
Popp et al.

(10) Patent No.: US 8,997,702 B2
(45) Date of Patent: Apr. 7, 2015

(54) ACTUATOR UNIT WITH REDUCED ACTUATOR PIN FRICTION

(71) Applicant: Schaeffler Technologies AG & Co. KG, Herzogenaurach (DE)

(72) Inventors: Oliver Popp, Hirschaid/Juliushof (DE); Martin Steigerwald, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 78 days.

(21) Appl. No.: 13/861,572

(22) Filed: Apr. 12, 2013

(65) Prior Publication Data
US 2013/0276564 A1 Oct. 24, 2013

(30) Foreign Application Priority Data
Apr. 20, 2012 (DE) .......................... 10 2012 206 569

(51) Int. Cl.
| | |
|---|---|
| F01L 9/04 | (2006.01) |
| F16H 21/44 | (2006.01) |
| F01L 13/00 | (2006.01) |
| H01F 7/124 | (2006.01) |
| H01F 7/16 | (2006.01) |

(52) U.S. Cl.
CPC ............ F16H 21/44 (2013.01); F01L 13/0036 (2013.01); H01F 7/124 (2013.01); H01F 7/1646 (2013.01); F01L 2013/0052 (2013.01); F01L 2820/01 (2013.01)

(58) Field of Classification Search
USPC ....................................................... 123/90.11
See application file for complete search history.

(56) References Cited

U.S. PATENT DOCUMENTS

| 8,339,225 B2 | 12/2012 | Nendel | |
|---|---|---|---|
| 8,474,424 B2 * | 7/2013 | Meintschel et al. | ....... 123/90.18 |
| 2004/0201441 A1 | 10/2004 | Elendt et al. | |
| 2011/0240892 A1 | 10/2011 | Nendel | |
| 2012/0235777 A1 | 9/2012 | Elendt et al. | |

FOREIGN PATENT DOCUMENTS

| DE | 202009015466 | 3/2010 |
|---|---|---|
| DE | 102009056609 | 6/2011 |
| DE | 102010045601 | 3/2012 |
| DE | 10 2011 079 | 1/2013 |
| WO | WO03/021612 | 3/2003 |
| WO | WO 2010/097298 | 9/2010 |
| WO | WO2010097298 | 9/2010 |
| WO | WO2010112111 | 10/2010 |
| WO | WO 2013/007403 | 1/2013 |

* cited by examiner

Primary Examiner — Ramon Barrera
(74) Attorney, Agent, or Firm — Davidson, Davidson & Kappel, LLC

(57) ABSTRACT

An actuator unit (1) of a cam shifting system, which actuator unit is mountable on an internal combustion engine or a component thereof and has at least one actuator pin (5) for moving shifting cam units of the cam shifting system into different axial positions by means of at least one shift groove formed on the periphery of the shifting cam units and cooperating with the actuator pin (5). The actuator pins (5) are spring-loaded in a direction toward the shifting cam unit, operable by a solenoid unit, and slidably supported in a housing (2) of the actuator unit (1). The housing (2) of the actuator unit (1) is provided with at least one enlargement in each inner surface facing an actuator pin (5).

6 Claims, 4 Drawing Sheets

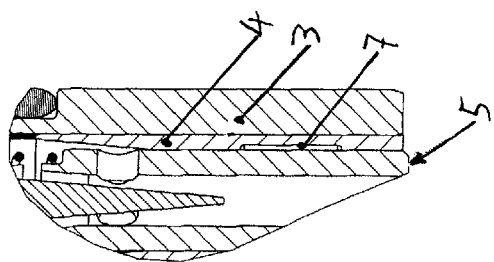
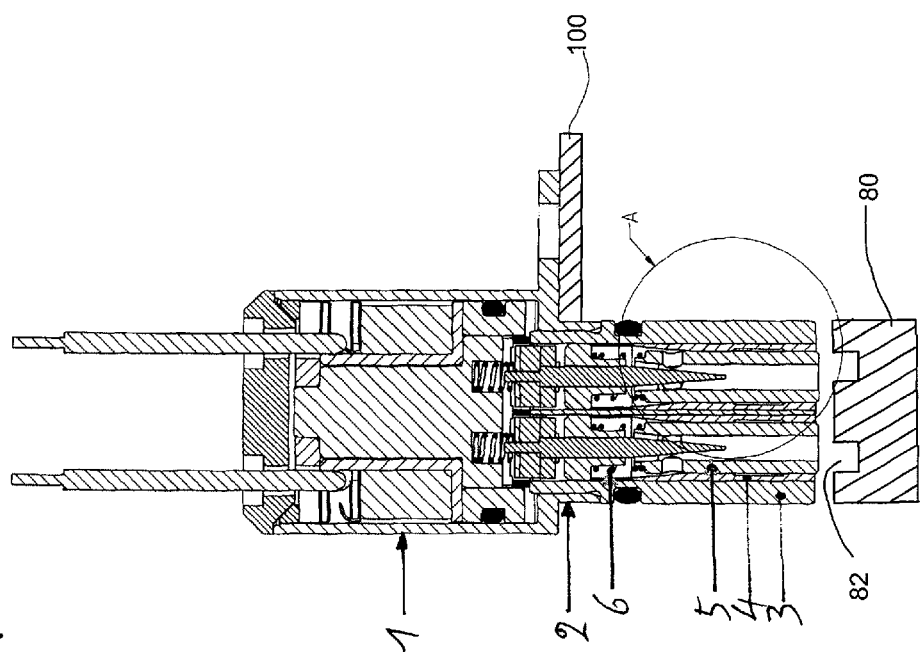

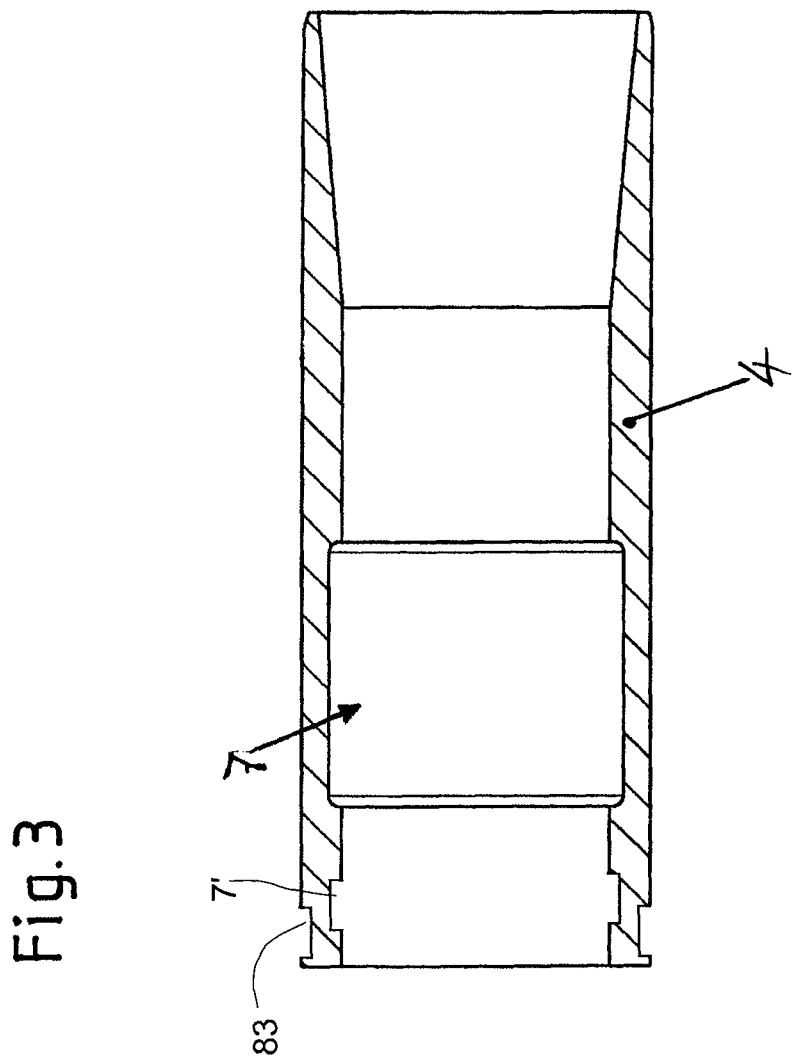

ACTUATOR UNIT WITH REDUCED ACTUATOR PIN FRICTION

This claims the benefit of German Patent Application DE 10 2012 206 569.5, filed Apr. 20, 2012 and hereby incorporated by reference herein.

An actuator unit of a cam shifting system, which actuator unit is mountable on an internal combustion engine or a component thereof and has at least one actuator pin for moving shifting cam units of the cam shifting system into different axial positions by means of at least one shift groove formed on the periphery of the shifting cam units and cooperating with the actuator pin, the actuator pins being spring-loaded in a direction toward the shifting cam unit, operable by a solenoid unit, and slidably supported in a housing of the actuator unit.

BACKGROUND

Internal combustion reciprocating piston engines having corresponding actuator units are known from WO 2011/097298 A1, related to U.S. Pat. No. 8,339,225 and hereby incorporated by reference herein. The actuator unit described therein has actuator pins which are disposed side-by-side and are each slidably supported in a respective housing connected to the actuator unit. The housing is provided at its inner end with conical enlargements which serve to lock the actuator pins in their inner, retracted position and which hold the actuator pins in the spring-loaded position. The guideway between the actuator pins and the housing is cylindrical throughout its entire length to provide efficient and sufficient guidance of the actuator pins within the housing, and thus on the actuator unit.

Due to the cylindrical guideway throughout the length between the housing and the actuator pins, the extension time of the actuator pins is influenced by fluid friction. This influence increases with decreasing temperature. In order to achieve the required extension time at low temperatures, and thus to reach the shift groove at the right time, the force of the springs that extend the actuator pins would have to become disproportionately large. This would also place very high stresses on the locking device.

Increasing the play between the actuator pin and the housing would promote tilting of the actuator pins within the housing, as a result of which an unfavorable line of contact would be formed between the actuator pin and the shift groove or the wall thereof.

SUMMARY OF THE INVENTION

It was already proposed in published patent document DE 10 2011 079 189, not necessarily prior art to the present invention, to provide recesses at the periphery of the actuator pins to reduce friction and shearing forces. However, this may lead to increased stress on the actuator pin, thus endangering the durability of the actuator pins.

It is an object of the present invention to overcome the above-described drawbacks, and to reduce the fluid friction between the actuator pin and the housing, thereby enabling a reduction in the extension time needed to extend the actuator pins from the actuator unit. This should be achieved with simple and cost-effective means.

The present invention provides the housing of the actuator unit with at least one enlargement in each inner surface facing an actuator pin. The enlargement can already be made during the manufacture of the housing in a simple manner, since the enlargement needs no machining. The enlargement may also take the form of a machined annular recess and may be formed later. The housing may advantageously have guide sleeves for the actuator pins, the guide sleeves being fixed within the housing of the actuator unit. In this case, the enlargements or annular recesses are formed in the guide sleeves. If the guide sleeves are manufactured separately from the housing, the annular recesses can be made particularly easily.

These measures result in a reduction in fluid friction, thereby achieving faster extension times for the actuator pins, without increasing the force required by the springs to extend the actuator pins from the actuator unit, and without increasing the guide clearance between the actuator pins and the housing or the guide sleeves. This makes it possible, in particular, to achieve sufficiently fast extension times for the actuator pins even at low temperatures down to −10° C. Of course, it is possible to provide a plurality of enlargements or annular recesses in the housing or in the guide sleeves in axially spaced-apart relationship to each other. The length and depth of the enlargements or annular recesses can be adapted to the requirements of each case without risk of tilting of the actuator pins. Also, the actuator pins are thereby not weakened.

Alternatively to the enlargements or annular recesses, another approach proposes to provide at least two annular elements in place of the guide sleeves, the annular elements being fixed within the actuator unit in axially spaced-apart relationship to each other. As a result, annular spaces are formed between the annular elements, said annular spaces reducing the fluid friction accordingly. Here, too, it is possible to provide a plurality of annular elements, so that a plurality of annular spaces are formed.

It is also proposed that the diameter of contact of the actuator pins with the shift grooves be reduced in diameter, thereby minimizing the friction between the sides of the shift grooves and the actuator pins, which allows a further reduction in extension time.

BRIEF DESCRIPTION OF THE DRAWINGS

For a more detailed description of the present invention, reference is made to the drawings, which illustrate exemplary embodiments of the present invention and in which:

FIG. 1 shows a longitudinal section through an actuator unit having annular recesses in guide sleeves;

FIG. 2 shows a portion of FIG. 1 on an enlarged scale;

FIG. 3 shows a section through a guide sleeve on an enlarged scale;

DETAILED DESCRIPTION OF THE DRAWINGS

Figure 4:
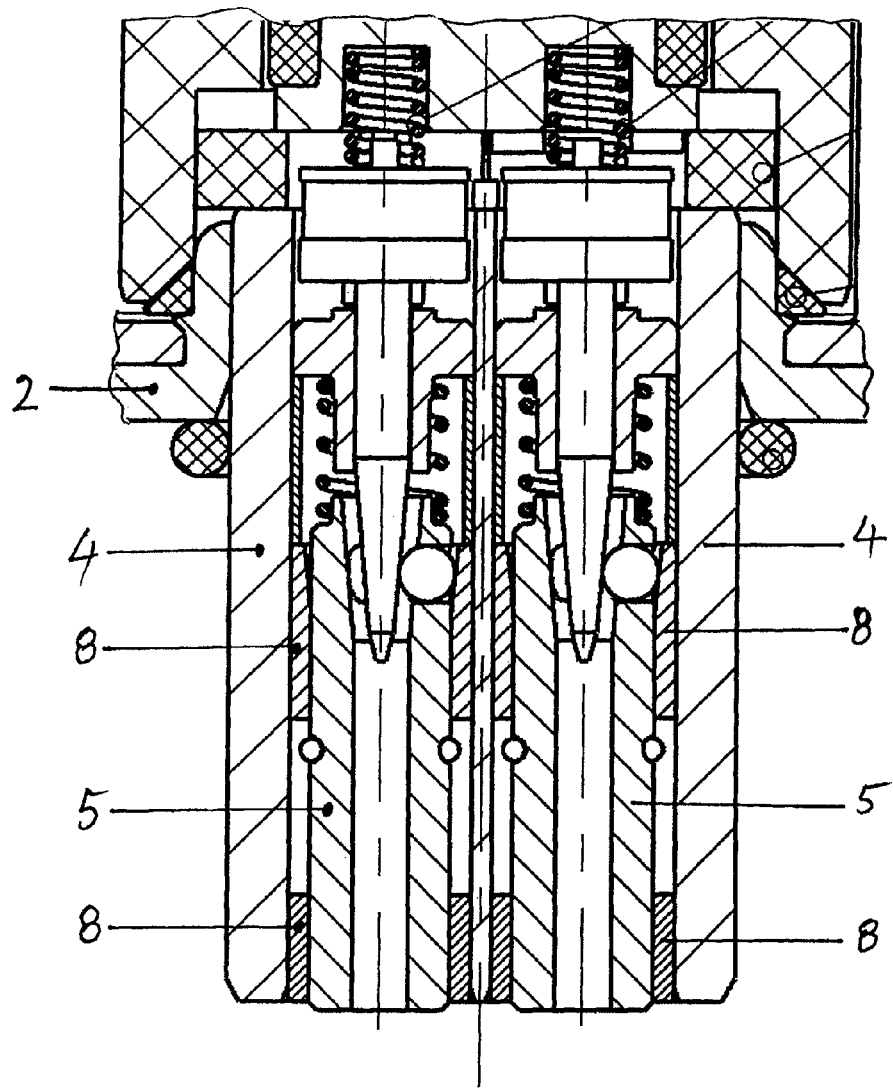
FIG. 4 shows a section through an actuator unit similar to that of FIG. 1, but where two annular elements are provided.

Referring now to the details shown in FIGS. 1 through 5, reference numeral 1 denotes generally an actuator unit including a housing 2 which adjoins an electromagnetic actuating unit and is mountable on a cylinder head 100, shown schematically, or a component connected therewith, and which has a neck 3 extending into an opening of the cylinder head or a component thereof. Housing 2 is configured such that two guide sleeves 4 are mounted side-by-side therein and fixed in housing neck 3. However, housing 2 may also be configured such that only one guide sleeve 4 is provided. Each guide sleeve 4 has slidably supported therein an actuator pin 5 which is axially movable therein. Actuator pins 5 may also be mounted directly in housing 2 or housing neck 3, without guide sleeves 4. Actuator pins 5 are loaded by springs 6 in the direction of extension; i.e., in a direction away from the solenoid unit. The actuator pins 5 move shifting cam units 80 shown schematically of the cam shifting system into different axial positions via at least one shift groove 82 also shown schematically formed on a periphery of the shifting cam units and cooperating with the actuator pins 5. The diameter of contact of the pins 5 with the shift grooves can be reduced as shown schematically at 83.

The actuator pins 5 are held in their retracted position by a locking device which bears against a conical enlargement within guide sleeves 4 or housing neck 3 or housing 2. As can be seen, in particular, from FIGS. 2 and 3, guide sleeves 4 have annular recesses 7 which have a larger diameter than the portions of the guide sleeves 4 adjacent the recesses 7. In this way, the fluid friction between actuator pins 5 and guide sleeves 4 is markedly reduced, which becomes particularly noticeable at low temperatures. It is, of course, also possible to provide a plurality of annular recesses 7 in guide sleeves 4, for example via a second recess 7' shown schematically in FIG. 3. The size; i.e., the length and depth, should be adapted to the requirements and dimensions of actuator pins 5. Accurate guidance of actuator pins 5 within guide sleeves 4 is still fully ensured by the sliding surfaces adjacent to the annular recesses.

As shown in FIG. 4, it is also possible to provide annular elements 8 in place of the guide sleeves to provide accurate guidance of actuator pins 5. The annular elements form an axial space therebetween which corresponds in function to the enlargements or annular recesses.

Figure 5:
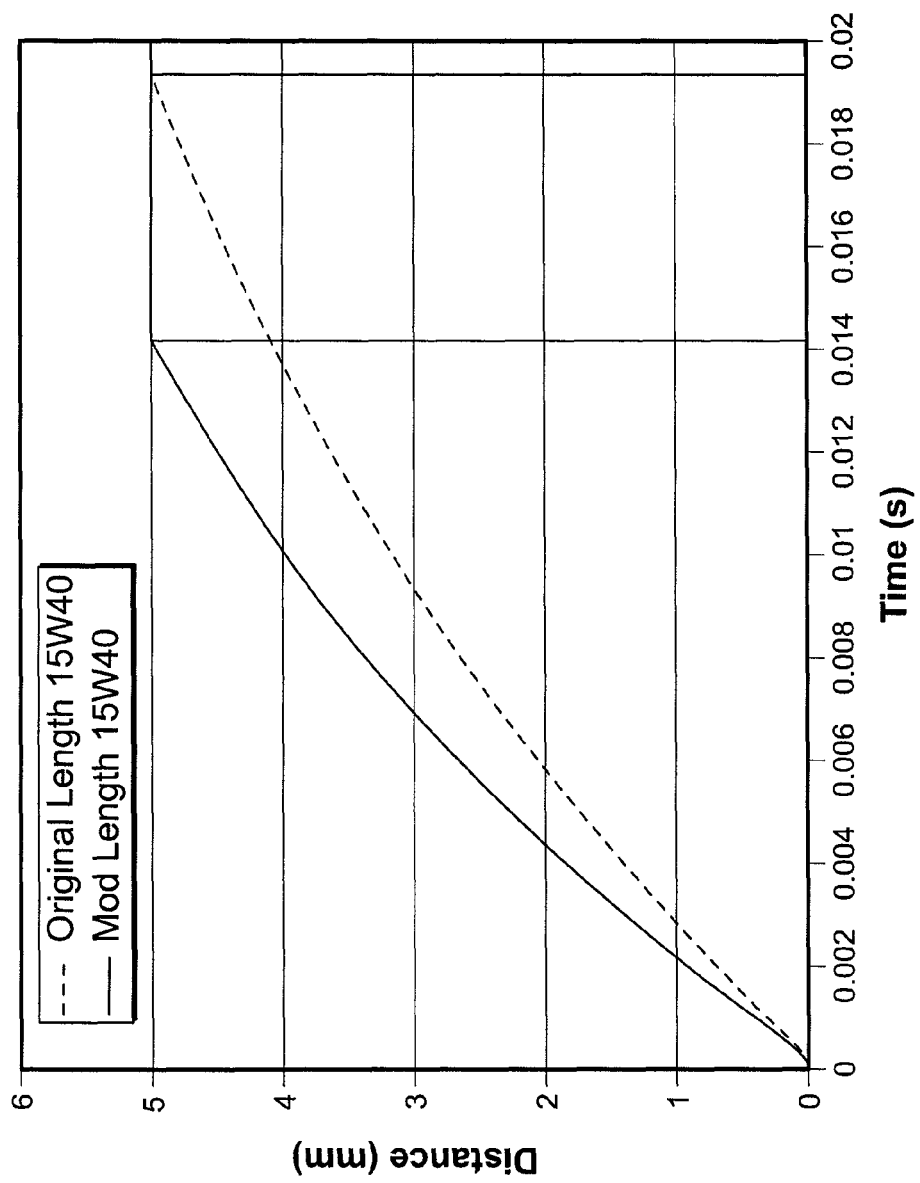
FIG. 5 shows a diagram illustrating the reduction in the extension times of the actuator pins which is achieved by the measures according to the present invention.

In FIG. 5, the lower curve, according to which a distance of 5 mm is traveled in a period of a little less than 0.02 sec, represents the time profile for a completely plane guideway between guide sleeve 4 and actuator pin 5, which is known from the prior art.

The improved curve represents an embodiment according to the present invention where an annular recess is provided in each of the guide sleeves 4 or the annular elements 8 performing the guiding function. Here, the distance of 5 mm is reached already after approximately 0.014 sec.

LIST OF REFERENCE NUMERALS 1 actuator unit
2 housing
3 housing neck
4 guide sleeves
5 actuator pins
6 springs
7 annular recesses
7' axially spaced annular recess
8 annular elements
80 cam units
82 shift grooves
83 reduced diameter of contact
100 cylinder head

What is claimed is:

1. An actuator unit of a cam shifting system, the actuator unit mountable on an internal combustion engine or a component thereof and comprising:
at least one actuator pin for moving shifting cam units of the cam shifting system into different axial positions via at least one shift groove formed on a periphery of the shifting cam units and cooperating with the actuator pin, actuator pins of the at least one actuator pin being spring-loaded in a direction toward the shifting cam unit, operable by a solenoid unit, and slidably supported in a housing of the actuator unit,
the housing of the actuator unit being provided with at least one enlargement in each inner surface facing one of the actuator pins, each enlargement being formed by an annular recess surrounding the respective actuator pin, each annular recess being axially between an adjacent first portion of the housing and an adjacent second portion of the housing and having a larger diameter than the adjacent first portion and the adjacent second portion.

2. The actuator unit as recited in claim 1 wherein enlargements of the at least one enlargement are provided in fixed guide sleeves of the housing.

3. The actuator unit as recited in claim 1 wherein each annular recess is a machined annular recess.

4. The actuator unit as recited in claim 1 wherein a plurality of enlargements are provided spaced-apart in an axial direction of the housing.

5. An actuator unit of a cam shifting system, the actuator unit mountable on an internal combustion engine or a component thereof and comprising:
at least one actuator pin for moving shifting cam units of the cam shifting system into different axial positions via at least one shift groove formed on a periphery of the shifting cam units and cooperating with the actuator pin, actuator pins of the at least one actuator pin being spring-loaded in a direction toward the shifting cam unit, operable by a solenoid unit, and slidably supported in a housing of the actuator unit,
the housing of the actuator unit being provided with at least one enlargement in each inner surface facing one of the actuator pins,
wherein at least two annular elements are provided in the housing and fixed within the housing in axially spaced-apart relationship to each other to define the at least one enlargement.

6. The actuator unit as recited in claim 1 wherein a diameter of contact of the actuator pins with the shift grooves is reduced.

* * * * *